5990X
Ronaldson & Neill.
Marine Railway.
Patented May 22, 1830.
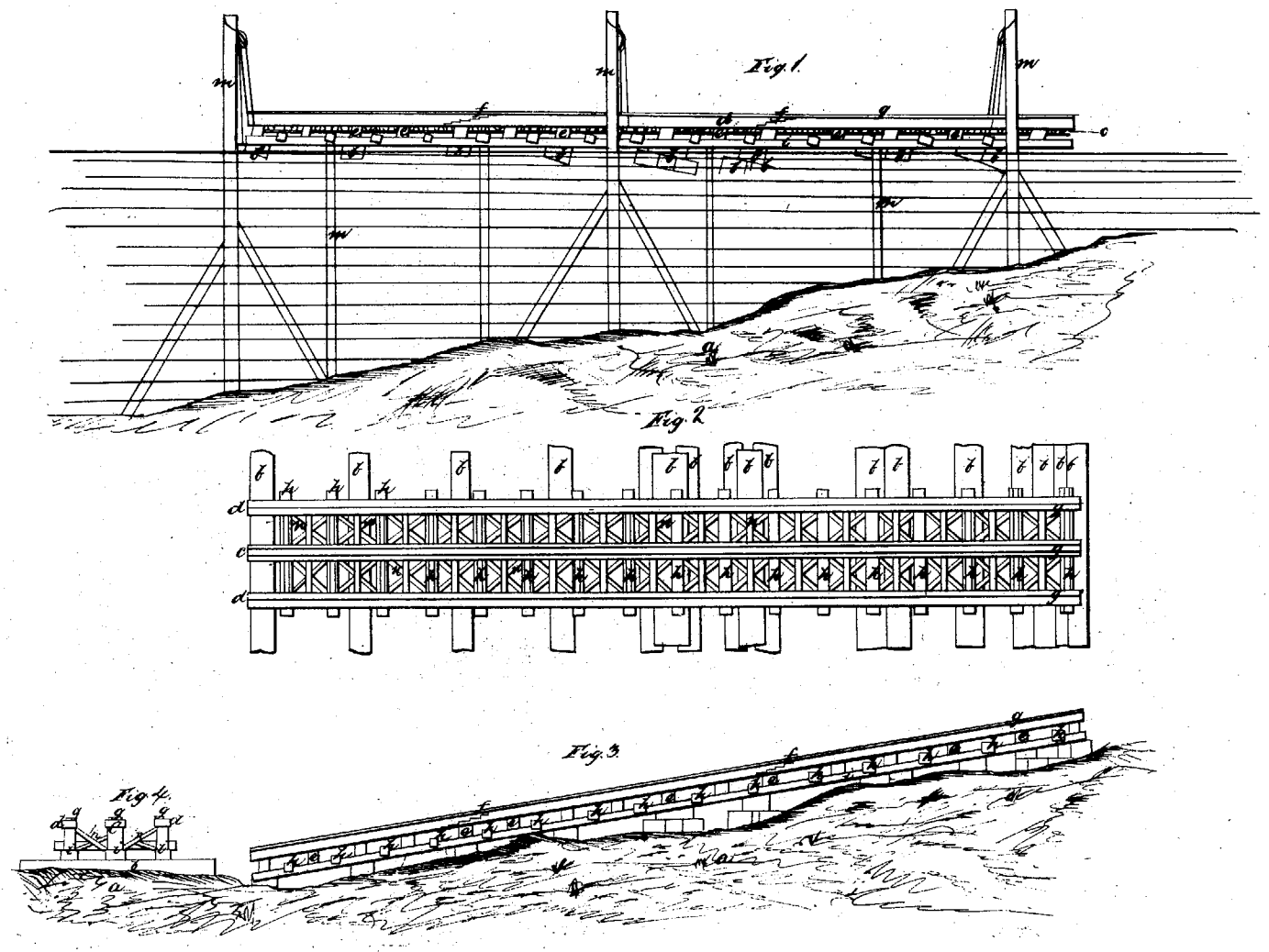
THE GRAPHIC CO. PHOTO-LITH. 39 & 41 PARK PLACE, N.Y.

May 22. 1830 5990X 295

James Ronaldson & John L. Neill. of Philadelphia

Letters Patent.

The schedule referred to in these Letters Patent and making part of the same containing a description in the words of the said James Ronaldson and John Lindsay Neill, themselves, of their Improvement in the mode of laying the foundation of Marine Railways To all persons whom it may concern.

Be it known that we James Ronaldson of the city and County of Philadelphia in the state of Pennsylvania and John Lindsay Neill, a Foreigner who has resided within the united States for two years, have invented and applied to use, a new mode of laying the foundation of Marine Railways, under water, and that the following is a full and exact description of the same, and of the manner in which it has been carried into operation.

Our said invention is particularly intended for marine railways, in places where, from the nature of the bottom of a River or other water, on which it is to be established piles cannot be securely driven, or where the expense of driving them and of erecting the required structure upon them, would form a serious objection thereto. It is also applicable in all situations where the bottom is of hard substance and is equally efficacious with a foundation of piles; and can be carried into operation in many instances with much greater fac[illegible] and less expense.

A proper survey of the bottom upon which the Railway is to be erected, must first be made in order to ascertain the proper shape or curvature, which should be given to the under part of the frame work of which the foundation, and Railway below the water are to consist. This frame may be made and braced together in various ways, the sills being so formed as to adapt themselves to the bottom and the upper part, or rails having such an inclination, as may be considered best for the intended purpose. In forming the Philadelphia Marine Rail way, the work was put together over the place where it was to be used, but it may be formed, or framed elsewhere and transferred to its place of destination. The framing was commenced by fixing a number of beams, strong enough to sustain the intended superstructure, and in

5990X such relative position, as that a line crossing them, would have the same cur-
-vature with the bottom of the river, which is to be the foundation. Upon these
beams, were laid three sets of sills parallel to each other, the centre sill
being situated under the keel rail, and the two side ones, under the bilge rails.
The sills were united together by logs, forming cross ties and into the upper
sides of the sills were inserted posts to support the rails; These posts were tenoned
into the sills sufficiently deep to admit of a treenail. The whole of the sills, rails
and posts, being strongly braced by timber, framed into them diagonally and other-
wise to give them the requisite strength, Iron bolts, dovals, and treenails, were
also driven when they were deemed useful, The scarfs of the ways, or wooden
rails were all dovetted and bolted, and made to rest on the posts, the ways
were likewise dovetted to each cross tie besides bolting. The upper sides of
the ways or wooden rails were made perfectly even, and the iron rails
then securely bolted upon them.

The manner in which this framing was effected, is represented in the
drawing, and also in a model deposited in the Patent office, they are deposited
in compliance with the law which requires that drawings with written references
be furnished, and they serve to exibit, in a practical way, how the invention has
been carried into effect.

The frame when completed, is to be sunk into its place, Before this is done, the
bottom upon which it is to stand, must, if covered by any loose substance, be scraped so
as to remove what ever might interfere with its adapting itself thereto, The mode
which we adopted for sinking the frame, was first, to lay a floor upon the cross logs
or ties, and fasten planks to the sides, these planks were to keep in the stone or ma-
terial, used to sink the frame, The supporting beams were then removed, and the
whole frame let down by tackles that held it suspended, when the cross beams were
taken out, To save the trouble and expense of procuring large stones, small
ones were put into barrels, and headed up in order to retain them in the
situations where they were required. The frame was then sunk into its place
and loose stone, earth, and sand, then thrown into, and around the whole,

We claim as our invention, the mode in which the above frame was put together
and we claim as new, and our invention, the method of making the foundation
and the fixing of a Marine Railways, under water without the driving of piles the making of coffer dams, the using of diving bells, or any similar structures as
usually employed for that purpose,
If the railway is intended for large vessels the having five railways viz one under
the keel, one under each bilge, and one on each side for the support of the upper
works of the vessel, with shores, are all considered modifications of the princi-
ple herein described - and we accordingly claim this method also as our
invention.

Witnesses
John Binny
William W. Fadden [illegible]

James Ronaldson
John L. Neill

Exd.
Chf.W.

952 [illegible]